US005195557A

United States Patent [19]

Fournier

[11] Patent Number: 5,195,557

[45] Date of Patent: Mar. 23, 1993

[54] VALVE WITH A CONTROL CHAMBER AND WITH CONTROLLED CLOSING

[75] Inventor: Jacques Fournier, Bretigny S/Orge, France

[73] Assignee: Schlumberger Industries, Paris, France

[21] Appl. No.: 862,327

[22] Filed: Apr. 2, 1992

[30] Foreign Application Priority Data

Apr. 4, 1991 [FR] France ............................... 91 04096

[51] Int. Cl.[5] ...................... F16K 39/02; F16K 31/122

[52] U.S. Cl. ................................ 137/509; 137/630.14

[58] Field of Search .................... 137/509, 510, 630.14, 137/630.15, 489.3, 490

[56] References Cited

U.S. PATENT DOCUMENTS 4,342,328 8/1982 Matta ............................ 137/630.14
4,762,203 6/1987 Holkeboer ......................... 250/289
4,978,374 12/1990 Janssen et al. ...................... 55/165

FOREIGN PATENT DOCUMENTS 2831733 1/1980 Fed. Rep. of Germany ........................ 137/630.15
1241287 8/1960 France .
389501 3/1933 United Kingdom .......... 137/630.14

*Primary Examiner*—Stephen M. Hepperle
*Attorney, Agent, or Firm*—Frishauf, Holtz, Goodman & Woodward

[57] ABSTRACT

The invention relates to a valve with a control chamber and with controlled closing, especially for hydrocarbon fuel dispensers. In order to avoid abrupt closing of the valve, especially in the case of accidental or abnormal operation of the dispenser, the valve is formed by a first piston, which can cooperate with a fixed seat to block the duct, and a second piston on which the control fluid acts. The first piston is provided with a bore which is closed when the second piston is applied to the first piston. A spring is fitted between the two pistons.

6 Claims, 2 Drawing Sheets

VALVE WITH A CONTROL CHAMBER AND WITH CONTROLLED CLOSING

The present invention concerns to a valve with a control chamber and with controlled closing, particularly but not exclusively a main valve in a hydrocarbon fuel dispenser.

More particularly the invention relates to a valve whose closing can be controlled as a function of the pressure which obtains in a control chamber acting on the rear face of the valve, and in which the time required for complete closing under the action of the control pressure can be controlled.

BACKGROUND OF THE INVENTION

In European patent application EP-A 0 357 513 there is described a hydrocarbon dispenser comprising means for controlling the gas content in the hydrocarbon being dispensed. As is known, a hydrocarbon dispenser comprises not only a shutoff valve in the dispenser nozzle but also a main valve upstream of the dispenser nozzle hose, accordingly between the dispensing pump and the dispenser nozzle. In the cited application, there is described a system allowing the closure of the main valve to be brought about automatically when the gas content in the hydrocarbon is above a predetermined percentage. To this end a system either allows the control chamber of the main valve to be at atmospheric pressure when the gas content is normal, thus allowing the open position of the main valve to be maintained, or shuts off the control chamber, which effects closure of the main valve through increasing the pressure in the chamber, even if the valve of the dispenser nozzle is kept open, i.e. even if the dispensing pump continues to operate.

The problems which can arise in relation to the main valve will be better understood with reference to the accompanying FIGS. 1*a* and 1*b*.

The valve of the European application referred to above is shown in FIG. 1*a*, in its open position. The valve comprises a piston 22 sliding in a control chamber 38. The control chamber is normally under atmospheric pressure through the pipe 36. The piston 22 can cooperate with a seat 19 which surrounds the outlet pipe 18 leading to the dispenser nozzle. Also shown is the pipe 16 through which the hydrocarbon fed by the pump is received. The piston 22 tends to be applied against its seat 19 by a return spring 44 fitted in the chamber 38. When the gas content of the hydrocarbon is normal, the chamber 38 is at atmospheric pressure. When the dispenser is operating, the high pressure which obtains in the pipe 16 acts on the face **22*a* of the piston 22, causing the main valve to open. When the gas content exceeds a predetermined value, the pipe 36 is closed and, because of the opening 40 formed through the piston 22, the high pressure applied through the pipe 16 is established in the control chamber 38 also, which causes the main valve to close under the action of the spring, the piston 22 coming into contact with its seat 19**.

In FIG. 1*b* there is shown the main valve in the closed position, i.e. with the piston 22 on its seat 19. The diameter of the piston 22 is denoted D and the diameter of the seat **19*d*, which is substantially that of the pipe 18**.

In normal operation, when atmospheric pressure PA obtains in the chamber 38, and the high pressure HP is applied via the duct 16, the equilibrium of the piston 22 can be expressed as follows:

$$(HP-PA)\cdot\pi(D^2-d^2)+(LP-PA)\cdot\pi d^2=F$$

where F is the compressive force exerted by the spring 44, LP is the low pressure in the pipe 18 following closure of the main valve, and HP is the high pressure in the pipe 16.

It will be seen that, when the main valve re-opens, the pressure LP contributes to this opening so long as it is above atmospheric pressure PA. On the contrary, if the pressure LP is lower than atmospheric pressure, it creates a partial vacuum which opposes opening of the main valve when the pressure HP is applied. It is easy to see that, depending on the amount of the under-pressure in the pipe 18 and depending on the value assumed by the high pressure HP, a situation can arise in which it will not be possible to get the main valve to open by the application of the high pressure in the duct 16.

Two main cases can be seen of situations which can create an under-pressure in the pipe 18.

The first situation is that in which the hydrocarbon dispenser is not operating, i.e. the valve of the dispenser nozzle is closed. Under these circumstances, a vehicle running over the hose of the dispenser nozzle creates an excess hydrocarbon pressure in the hose. This excess pressure introduced into the hose and thus into the pipe 18 is sufficient to cause the piston 22 to lift. This results in the transfer of a fraction of the hydrocarbon in the duct 18 to the duct 16, in correspondence with the squashing of the hose. As soon as enough liquid has been transferred to bring down the pressure in the duct 16, the piston can return to its seat under the action of the spring. When the wheel moves off the hose, this tends to regain its initial volume, creating an underpressure as a result of the lack of liquid relative to the prior situation. The partial vacuum in the hose of the nozzle is made possible by its stiffness. In some cases it has been possible to observe an under-pressure of 700 millibars with some types of hydrocarbons.

Another situation which can involve the creation of an under-pressure in the pipe 18 is as follows. When an abnormal gas content is detected, the main valve 22 closes abruptly under the action of the rapid increase of pressure in the control chamber 38. However the inertia of the column of liquid between the valve 22 and the dispenser nozzle at the end of the hose has to be taken into account. This column of liquid is moving at a speed of several meters per second during the supply of hydrocarbon. The abrupt closure of the piston 22 does not allow all of the flow in the region of the nozzle to stop immediately, so that an under-pressure occurs which is established in the hose and hence in the outlet pipe 18.

In order to overcome this problem it is an object of the present invention to provide a valve with a control chamber with means to control the speed of complete closing during the application of pressure in the control chamber.

SUMMARY OF THE INVENTION

According to the invention, to achieve this object, the valve assembly which comprises a piston assembly with a first face located in a control chamber receiving a control pressure and a second face adapted to cooperate with a fixed seat to interrupt the flow of a fluid between an inlet duct and an outlet duct, includes the improvement whereby said piston assembly comprises a first piston mounted to slide in the control chamber and a second piston having a first face which cooperates with said fixed seat around said outlet pipe and a second face which faces the second face of the first piston, said second piston including a through channel opening out to face said outlet pipe, and whereby said piston assembly further comprises means on said first and second pistons to provide sealing between said pistons when they are applied one against the other, means to effect displacement of the first piston and not of the second piston during the application of the high pressure in the inlet duct, and means to separate the second piston from the seat when said first piston has been displaced a predetermined distance under the effect of the application of the high pressure.

It will be understood that there is thus provided a valve with two pistons which open in succession or which close in succession. In the opening phase, because of the application of the high pressure, the first piston alone opens, which opens up a reduced flow cross-section corresponding to the opening of the through channel. It is only in a second stage that the second piston moves in turn, thereby opening up the whole of the hydrocarbon flow cross-section.

On the contrary, when the pressure increases in the control chamber, the second piston comes into contact with its seat, but the first piston is not applied to the second during a first phase. In this situation, the high pressure hydrocarbon continues to flow through the through channel of the second piston. It is only at a second instant that the first piston is applied in sealed manner to the second piston to cause complete closure of the valve. It is thus seen that the closure of the valve is controlled so as to avoid creation of an under-pressure in the outlet duct.

BRIEF DESCRIPTION OF THE DRAWINGS

An embodiment of the invention is described by way of example with reference to the accompanying drawings, in which.

DETAILED DESCRIPTION

Figure 1A:
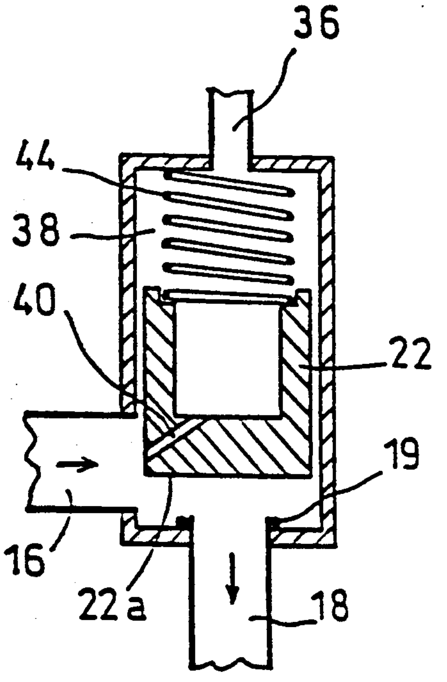
FIG. 1*a*, already described, is a vertical section through a prior art valve with a control chamber, in its open position.
Figure 1B:
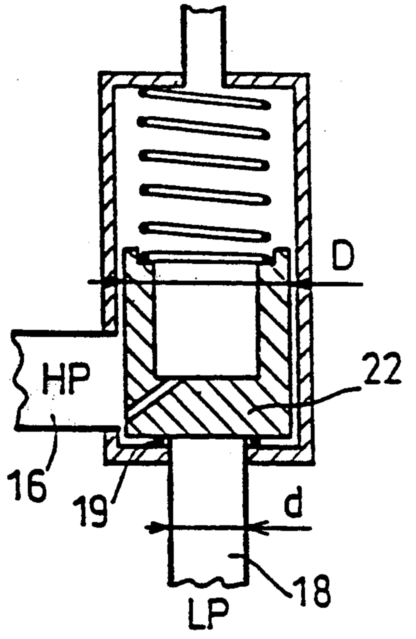
FIG. 1*b* shows the same valve in its closed position.
Figure 2:
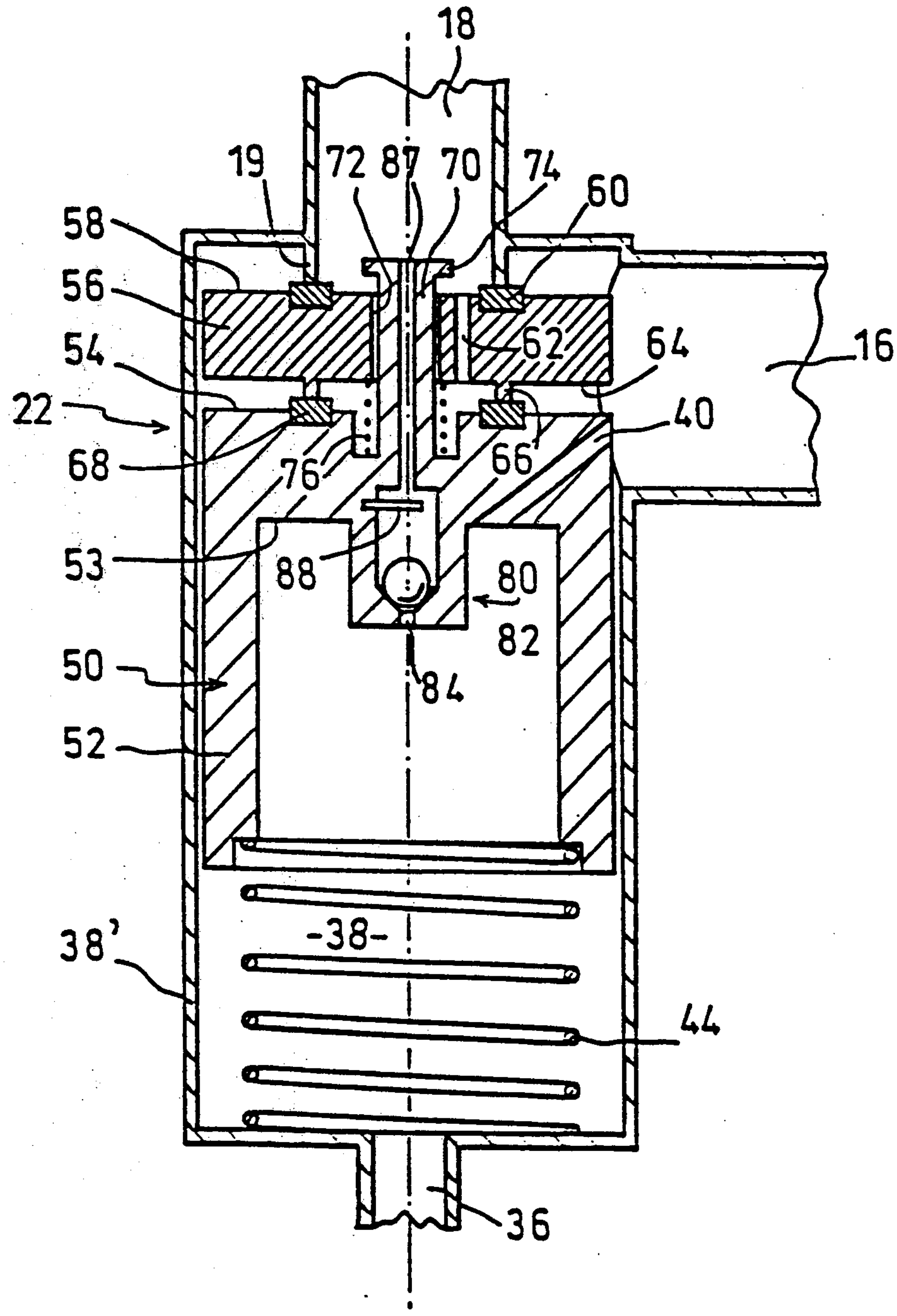
FIG. 2 is a vertical section through a main valve of the invention with a control chamber.

In FIG. 2 the references already used in connection with FIGS. 1*a* and 1*a* are repeated. Thus there is shown the control chamber 38 with its cylindrical wall 38', in which the valve 22 is mounted to slide freely. The control duct 36 opens into the control chamber 38. In this Figure there are likewise shown the outlet duct 18 surrounded by the seat 19 of the valve and the inlet duct 16 opening at the side in relation to the piston 22.

As has been indicated above, the valve 22 is formed by a first piston 50 with a sleeve 52 mounted to slide freely in the control chamber 38 and extending between a first piston face 53 and a second face referenced 54 facing away from the control chamber 38.

The valve 22 also comprises a second piston 56 located between the first piston 50 and the seat 19. The first face 58 of the second piston 56 comprises an annular sealing lining 60 cooperating with the seat 19 of the valve. A channel 62 passes through the second piston 56 from side to side and opens in the first face 58 of the second piston 56 facing the outlet pipe 18. The second face 64 of the second piston 56 is provided with a rim 66 forming the equivalent of a seat of a valve. The second face 54 of the first piston 50 is provided with an annular sealing lining 68 to cooperate with the seat 66 when the pistons 50 and 56 are placed together under the action of the return spring 44 fitted in the control chamber 38. An axial extension 70 from the second face 54 of the first piston 50 slides freely through the second piston 56, through an axial bore 72. The axial bore 72 is positioned facing the outlet duct 18, i.e. inside the part of the face 58 bounded by the sealing lining 60. The extension 70 ends in a collar 74 whose outer diameter is greater than the diameter of the bore 72. Furthermore a spring 76 is fitted between the pistons 50 and 56 around the extension 70, the spring 76 tending to separate the pistons 50 and 56 from each other.

When the valve is in its closed position, i.e. in the position shown in FIG. 2, the flow between the inlet pipe 16 and the outlet pipe 18 is almost completely interrupted because the second piston 56 is disposed in sealed manner on the seat 19 and the first piston 50 is disposed in sealed manner on the second piston 56. Accordingly, the through channel 62 and possible leaks through the opening 72 are closed by cooperation between the seat 66 and the sealing lining 68. However a small leakage is allowed via the channel 87, which is useful for getting rid of the under-pressure which is caused by the passage of a vehicle over the hose, as explained above.

The operation of the valve 22 is now described. It is initially assumed that it is in its normal operating state, i.e. the pressure in the control chamber 38 is substantially equal to atmospheric pressure. When the hydrocarbon dispenser is put in operation, i.e. when the pump is put into action, the pressure in the inlet duct 16 is increased, reaching the value HP. Under the action of this high pressure acting mainly on the peripheral annulus of the face 54 of the piston 50 outside the sealing lining 68, but also on the peripheral annulus of the piston 56, only the piston 50 is pushed back, compressing the spring 44 on account of the presence of the spring 76 fitted between the pistons 50 and 56. This results in a flow of hydrocarbon from the duct 16 to the outlet duct 18 through the through channel 62. When the piston 50 has been pushed back enough, the collar 74 on the extension 70 of the piston 50 mechanically separates the piston 56 from its seat 19. This then provides a direct flow of the hydrocarbon from the duct 16 to the outlet duct 18 through the entire flow cross-section defined by the seat 19.

When the pump of the dispenser is stopped abruptly, the pressure drops in the duct 16. This drop of pressure causes the piston 56 and piston 50 to be displaced together until the piston 56 comes into contact with its seat 19 under the action of the return spring 44. However, in this first phase the piston 50 stays spaced from the piston 56 under the action of the spring 76. As a result, in this phase, the hydrocarbon continues to flow through the through channel 62 towards the outlet pipe 18, which avoids placing this under reduced pressure. In a second phase, under the action of the spring 44 and when the pressure in the pipe 16 has fallen enough, the spring 76 is compressed and the piston 50 comes against the piston 56. More particularly the sealing part 68 comes into contact with the seat 66 of the piston 56. In this position the valve 22 is completely closed.

If, starting from the completely open position of the valve 22, it is assumed that the pipe 36 is blocked on account of an excess of gas in the hydrocarbon, an increase in the pressure in the control chamber 38 via the passage 40 results. The difference in pressure between the faces 53 and 54 of the piston thus tends to disappear and with it the corresponding force, so that the spring 44 can force the pistons 50 and 56 back towards the seat 19. However, during this phase, because of the presence of the spring 76, the piston 50 stays separated from the piston 56, which allows the hydrocarbon to flow through the through channel 62. When the piston 56 comes into contact with its seat 19, the piston 50 tends to compress the spring 76 under the combined effect of the return spring 44 and of the increase of the pressure in the chamber 38. The spring 76 is compressed until the sealing surface 68 of the piston 50 comes into contact with the seat 66 of the piston 56. In this position the valve 22 is completely closed under the combined effect of the spring 44 and of the difference in pressure between the chamber 38 (at the pressure HP) and the face 54 of the piston.

It will however be understood that, because initially only the piston 56 closes, a flow of hydrocarbon is permitted through the channel 62. The flow is not stopped abruptly and the appearance of an under-pressure in the hose due to of the inertia of the liquid column between the valve 22 and the nozzle is not to be expected.

As FIG. 2 shows, the valve of the invention preferably further comprises a device which allows the pressures between the control chamber 38 and the outlet duct 18 to be equalized when a slight under-pressure is created in the outlet pipe 18, in spite of the valve closing in two stages.

This device essentially comprises a ball valve 80 formed by a ball valve chamber 82 opening into the control chamber 38 through an orifice forming the valve seat 84. The ball valve 80 further comprises a ball 86 trapped in the chamber 82. The chamber 82 continues through an axial duct 87 of reduced diameter, which passes through the extension 70 of the piston 50. Accordingly the interior of the ball valve chamber 82 communicates permanently with the outlet duct 18. A pin 88 located inside the chamber 82 prevents the ball 86 blocking the channel 87. The operation of the ball valve is easy to understand. If an under-pressure appears in the hose of the dispenser, i.e. in the duct 18, the pressure difference rises and, applied downstream to the ball 86, causes it to separate from its seat 84. There is thus a flow of hydrocarbon from the chamber 38 to the pipe 18 via the channel 87 and from the channel 16 to the chamber 38 through the bore 40. This flow continues until the pressures in the pipe 18 and the control chamber 38 are equal. When such equality is attained the ball 86 falls back on to its seat 84 under gravity.

It will be understood that the ball valve acts through both the pistons 50 and 56 and thus increases the security of operation of the valve under exceptional circumstances where the closure of the main valve in two stages will not be enough to avoid the creation of an under-pressure in the outlet pipe and in the hose of the dispenser.

The possibility of opening the main valve in two stages with a limited flow during the first opening stage makes it possible to avoid cavitation noise, which can occur when the dispenser nozzle is opened before the pump is put into action. This is often the case in self-service stations where the pump cannot be started until the preceding customer has paid for the hydrocarbon which has been put into the tank of his vehicle. In this case a large acceleration of the suction column corresponds to a sudden demand on the flow. Since this column also has a large amount of inertia, the pump creates a greater under-pressure greater than is necessary before the nominal rate of flow of hydrocarbon had been reached. This gives rise to a risk of cavitation in the pump, with the resulting noise.

I claim:

1. A valve assembly comprising a piston assembly with a first face located in a control chamber receiving a control pressure and a second face adapted to cooperate with a fixed seat to interrupt the flow of a fluid between an inlet duct and an outlet duct, wherein said piston assembly comprises a first piston having a first and a second face mounted to slide in the control chamber and a second piston having a first face which cooperates with said fixed seat around said outlet pipe and a second face which faces the second face of the first piston, said second piston including a through channel opening out to face said outlet pipe, and wherein said piston assembly further comprises means on said first and second pistons to provide sealing between said pistons when they are applied one against the other, means to effect displacement of the first piston and not of the second piston during the application of the high pressure in the inlet duct, and means to separate the second piston from the seat when said first piston has been displaced a predetermined distance under the effect of the application of the high pressure.

2. A valve assembly according to claim 1, wherein the means for effecting a seal comprises first means fixed to the second face of the second piston and means fixed to the second face of the first piston to effect a seal between said faces at least around the mouth of said through channel when the two pistons are applied against each other.

3. A valve assembly according to claim 1, wherein the means for effecting the displacement of said first piston relative to said second piston comprise resilient means between the second face of the first piston and the second face of the second piston.

4. A valve assembly according to claim 1, wherein the means for separating the second piston from the seat comprise an extension from the second face of the first piston passing through said second piston through an opening, the end of said extension being adapted to cooperate with the first face of the second piston.

5. A valve assembly according to claim 1, further comprising a resilient return device in said control chamber tending to urge the first piston against the second piston and the first face of the second piston against the seat.

6. A valve assembly according to claim 4, wherein the first face of the first piston comprises a part forming a valve chamber with a seat opening into the control chamber, said valve chamber communicating with a channel passing through said extension of the first piston.

* * * * *